United States Patent [19]
Gilsdorf et al.

[11] Patent Number: 5,480,129
[45] Date of Patent: Jan. 2, 1996

[54] SHOCK ABSORBER WITH AIR SHOCK MODULE, AIR SHOCK MODULE FOR A SHOCK ABSORBER AND PROCESS FOR INSTALLATION OF THE AIR SHOCK MODULE AND SHOCK ABSORBER

[75] Inventors: Heinz-Joachim Gilsdorf, Ebenhausen; Heinz Sydekum, Dittelbrunn; Holger Gubitz, Schweinfurt, all of Germany

[73] Assignee: Fichtel & Sachs AG, Schweinfurt, Germany

[21] Appl. No.: 197,692

[22] Filed: Feb. 17, 1994

[30] Foreign Application Priority Data

Feb. 18, 1993 [DE] Germany .......................... 43 04 961.3

[51] Int. Cl.⁶ .......................... B60G 15/08; B60G 11/27; F16F 9/05
[52] U.S. Cl. .......................... 267/64.24; 188/322.12
[58] Field of Search .......................... 188/269, 298, 188/312, 322.12, 322.16, 322.17, 322.19; 267/64.15, 64.24, 64.26, 35

[56] References Cited

U.S. PATENT DOCUMENTS

| | | | |
|---|---|---|---|
| 3,700,225 | 10/1972 | Fader et al. | 267/35 |
| 4,392,638 | 7/1983 | Kato et al. | 267/64.24 |

FOREIGN PATENT DOCUMENTS

| | | |
|---|---|---|
| 1223183 | 6/1960 | France . |
| 0082525 | 1/1964 | France . |
| 1372991 | 8/1964 | France . |
| 1377424 | 9/1964 | France . |
| 2283020 | 8/1975 | France . |
| 2427922 | 6/1979 | France . |
| 1869264 | 3/1963 | Germany . |
| 2103152 | 7/1972 | Germany . |
| 2102268 | 7/1972 | Germany .......................... 267/64.27 |
| 3116466 | 11/1982 | Germany . |
| 4101065 | 7/1992 | Germany . |
| 57-11051 | 7/1982 | Japan . |

*Primary Examiner*—Josie A. Ballato
*Attorney, Agent, or Firm*—Nils H. Ljungman & Associates

[57] ABSTRACT

Pneumatic spring comprising an elastic expansion bellows, a receptacle fastened to the expansion bellows, at least one fastening element between the expansion bellows and the receptacle, a point where it is attached to the vehicle chassis, a piston rod of a shock absorber which has a shock absorber outer tube, which represents an unrolling surface for the expansion bellows, and connection mechanisms on the piston rod and on the shock absorber outer tube respectively for the attachment of the pneumatic spring shock absorber unit inside a vehicle chassis, characterized by the fact that the expansion bellows has a connecting piece which is braced against a piston-rod-side end surface of the shock absorber outer tube and that the receptacle has a cover, which interacts with a seal and which is braced against an axial mounting surface, which executes a relative motion in relation to the outer tube of the shock absorber identical to the motion executed by the vehicle body, whereby the axial fastening of the pneumatic spring is achieved by the system pressure inside the pneumatic spring by way of the locking piece and the cover piece.

20 Claims, 8 Drawing Sheets

SHOCK ABSORBER WITH AIR SHOCK MODULE, AIR SHOCK MODULE FOR A SHOCK ABSORBER AND PROCESS FOR INSTALLATION OF THE AIR SHOCK MODULE AND SHOCK ABSORBER

BACKGROUND OF THE INVENTION

1. Field of the Invention

This invention generally relates to a pneumatic spring comprising an elastic expansion bellows, a receptacle fastened to the expansion bellows, at least one fastening element between the expansion bellows and the receptacle, a point where an assembly comprising the pneumatic spring is attached to the vehicle chassis, a shock absorber having a piston rod and an outer tube, the outer tube representing an unrolling surface for the expansion bellows, and connection mechanisms on the piston rod and on the shock absorber outer tube respectively for the attachment of the pneumatic spring shock absorber unit inside a vehicle chassis.

2. Background Information

German Laid Open Patent Application No. 21 03 152 discloses a pneumatic spring in connection with a shock absorber, on which an expansion bellows, or rolling bellows is connected to the shock absorber by means of a tape tensioning element. As an axial safety device and/or to reduce the radial space required for the installation of the tape tensioning element, the outer tube of the shock absorber has a circular bead, such as an annular indentation, in which the tape tensioning element and the expansion bellows are fastened. One of several disadvantages of this solution is that the outer tube of the shock absorber must be fabricated individually for each application. The number of motor vehicles equipped with pneumatic springs is relatively small, however, which means that consideration must be given to the fact that each type of vehicle frequently requires its own individual shock absorbers. Therefore the solution proposed by German Laid Open Patent Appln. No. 21 03 152 does not appear to be economical in terms of the fabrication costs required for the production of small series.

German Patent No. 31 16 466 discloses a process for the installation of an expansion bellows with a shock absorber. Apparently, a standard shock absorber can advantageously be used without modifications of the shock absorber outer tube, but the installation process is quite complicated. A particular disadvantage relating to the safety of the finished product is that the welded joint between the receptacle and the piston rod must essentially provide support for the receptacle and simultaneously perform a sealing function for the pneumatic spring. There are also major problems relating to painting, since the shock absorbers are coated with corrosion protection agents only after they have been installed on the vehicle.

This embodiment and the assembly process also essentially rule out any retrofitting of an existing shock absorber with a pneumatic spring in a repair shop. Nor should the major effort required to remove the shock absorber be underestimated, since the separation of the pneumatic spring from the shock absorber can be very complex and time-consuming.

OBJECT OF THE INVENTION

The object of the present invention is to realize an economical pneumatic spring for a shock absorber, one which preferably features a shock absorber outer tube with no bead, whereby the installation expense is low and the problems encountered with known pneumatic springs are solved.

SUMMARY OF THE INVENTION

The invention teaches that this object can be achieved by a pneumatic spring in which the expansion bellows has a connecting piece which is braced against a piston-rod side end surface of the shock absorber outer tube and in which the receptacle has a cover which interacts with a seal and which is braced against an axial mounting surface and which executes a relative motion in relation to the outer tube of the shock absorber identical to the motion executed by the vehicle body, whereby the axial fastening of the pneumatic spring is achieved by the system pressure inside the pneumatic spring by means of the locking piece and the cover piece.

By taking advantage of the system pressure in connection with the cover and the locking piece, which are braced against one another, the tape tensioning element between the shock absorber outer tube and the expansion bellows can be advantageously eliminated. On a shock absorber which has a pin hinge or a threaded covering mechanism, even a conventional shock absorber can be retrofitted with a pneumatic spring.

There is essentially no need for a welding seam which must act as a seal against the system pressure of the pneumatic spring, because the cover piece preferably interacts with a seal.

The locking piece is preferably advantageously formed by a cup which includes a sleeve portion and a bottom which has an opening, whereby the diameter of the opening is preferably larger than the diameter of the piston rod. The bottom preferably represents the axial support surface for the locking piece on the shock absorber. It is appropriate if the outside diameter of the bottom is large enough that it lies on the lock-beading or rolled beading of the outer tube of the shock absorber, and does not exert any pressure the piston rod seal which is located radially inward.

The sleeve part of the cup can be easily connected to the expansion bellows by means of a tape tensioning element.

Alternatively, the cup can have a beaded, or flanged, rim which braces the expansion bellows against the sleeve part.

If there is only a small amount of radial space available for the expansion bellows, it is particularly advantageous if the sleeve part extends axially from the end surface of the shock absorber toward the piston rod connection mechanism. The outside diameter of the sleeve piece can then be kept significantly smaller than the inside diameter of the expansion bellows, so that contact with the receptacle or with the outer part of the expansion bellows can be prevented.

When there is only a small amount of axial space available for the pneumatic spring, the sleeve part can preferably extend axially in the direction of the connection mechanism on the shock absorber outer tube side. The bottom of the cup can then advantageously be used as an impact surface for a supplemental spring device.

In a very simple variant embodiment, the locking piece can preferably be an integral part of the expansion bellows. The end of the expansion bellows preferably has a smaller diameter than the shock absorber. A reinforcement can also be inserted to increase the strength of the expansion bellows in the vicinity of the opening.

For small production runs and to retrofit a pneumatic spring, there can preferably be a reclosable connection between the receptacle and the fastening element on the piston rod side by means of a threaded connection between the connection mechanism and the piston rod, which comprises an axial support surface for the cover. In practice, that means that essentially no modifications need to be made on an installed shock absorber, since the axial support surface is a component of the connection mechanism.

On larger production runs, for cost reasons, a welding process can preferably be used for the connection between the lug and the piston rod. In that case, the weld seam is essentially only required to perform a mounting, or holding, function. The sealing function is preferably performed by the seal, which preferably interacts with the cover piece.

For rather small production runs, it is appropriate if the cover piece of the receptacle is formed by a disk body, whereby a chambered seal can preferably be located between the piston rod and the disk body.

For large production runs, preferably, the cover piece is advantageously designed to be an integral part of the receptacle, whereby a chambered seal can be located between the piston rod and the cover piece.

A pneumatic spring according to the present invention can essentially be installed very easily by partly covering the expansion bellows with a locking piece. Then the free ends of the receptacle, equipped with a cover piece, and of the expansion bellows are preferably inserted into one another, and are then preferably connected by means of one or more tape tensioning elements. The shock absorber, with an at least partly extended piston rod, is preferably inserted into the expansion bellows, until the locking piece of the expansion bellows comes in contact against the end surface of the shock absorber. To complete the process, the connecting part of the receptacle is preferably threaded onto the piston rod of the shock absorber. No special tools are required for installation. The pneumatic spring can also be pre-assembled independently of the shock absorber.

Depending on the type of shock absorber, a connecting mechanism is preferably fastened to the piston rod, whereby the connecting mechanism preferably comprises mounting surfaces for the cover piece of the receptacle. Particularly suitable fastening methods, in addition to the threaded connection indicated above, include welding, in particular for larger production runs. In a few cases, the mounting surfaces can also be equipped with a disk on the piston rod at some distance, or also directly at the attachment point to the vehicle body.

BRIEF DESCRIPTION OF THE DRAWINGS

The invention is described in greater detail below with reference to the accompanying figures.

DESCRIPTION OF THE PREFERRED EMBODIMENTS

Figure 1:
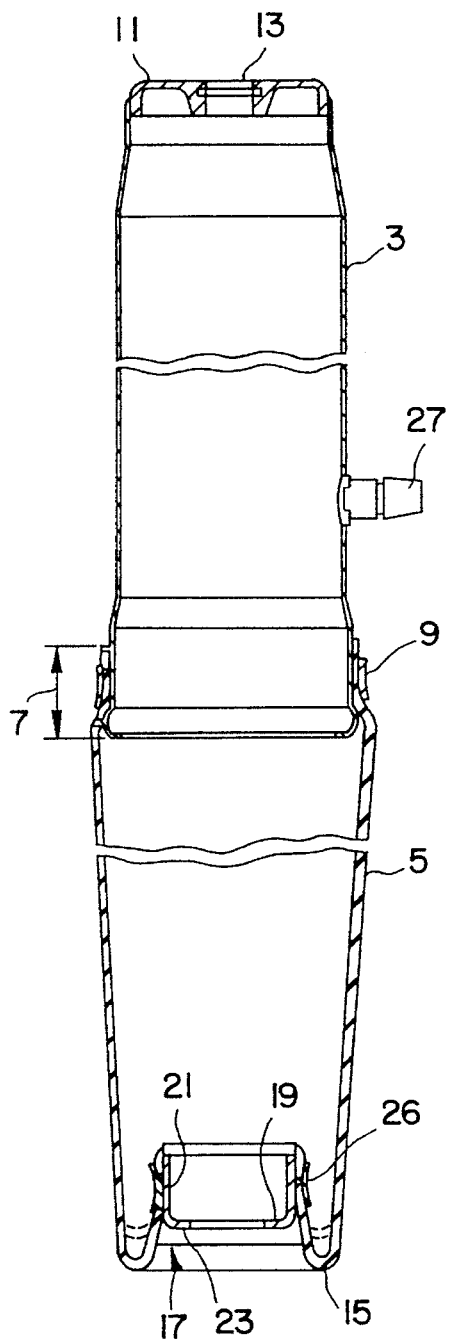
FIG. 1 shows a pneumatic spring in detail.

The pneumatic spring 1 illustrated in FIG. 1 preferably includes a receptacle 3 and an elastic expansion bellows 5. The receptacle 3 and the expansion bellows 5 are preferably inserted into one another over a short shoulder 7, and are preferably connected in an airtight manner by means of a tape tensioning element 9. On an end of the receptacle 3 opposite the shoulder 7, a cover piece 11 is preferably attached in an airtight manner, and the cover piece 11 preferably has a hole 13 in the center. The free end of the expansion bellows 5 is preferably turned up over a short length, so that there is preferably a fold 15. On the end of, the expansion bellows 5 preferably has a locking piece 17 designed as a cup 19. The cup 19 preferably includes a sleeve part 21 and a bottom 23 which has an opening 25. The sleeve part 21 is also preferably connected by means of a tape tensioning element 26 to the expansion bellows. The diameters of the hole 13 and the opening 25 are preferably such that a piston rod of a shock absorber can run through them.

To supply compressed air to the pneumatic spring, there is preferably a connection pipe 27 on the receptacle 3.

The pneumatic spring 1 or pneumatic spring shell can be fabricated completely independently of a shock absorber, up to the stage illustrated in FIG. 1.

Figure 2:
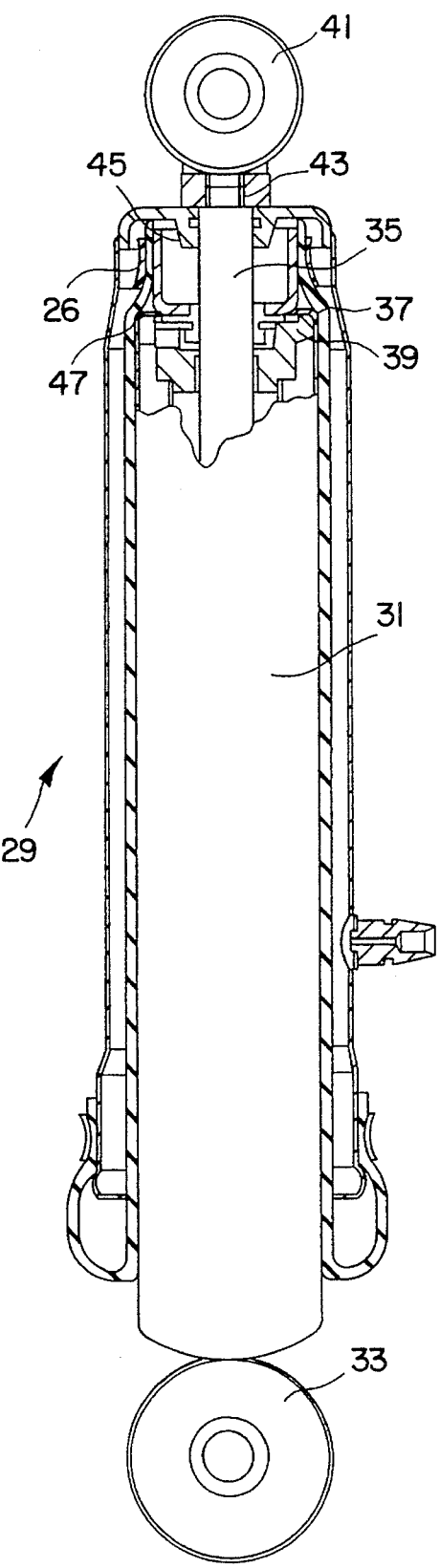
FIG. 2 shows a pneumatic spring following assembly with a shock absorber.

FIG. 2 shows a fully-assembled shock absorber 29. The illustration of the shock absorber 29 is limited to an outside view which shows a shock absorber outer tube 31, the end of which is equipped with a connecting mechanism 33 for attachment to a wheel mounting. It should be understood that shock absorber 29, when assembled with pneumatic spring 1, essentially represents a "shock absorber assembly" in accordance with the present invention.

During the assembly of the shock absorber 29 with the pneumatic spring 1, the shock absorber 29 with a partly extended piston rod 35 is preferably introduced through the opening 25 of the locking piece 17 into the pneumatic spring 1, until the bottom 23 of the cup 19 comes into contact against a flange 37 of the shock absorber outer tube 31 on a piston rod guide 39. Then the cover 11 is preferably threaded by means of its central hole 13 onto the piston rod 35. During this process, the expansion bellows preferably lies against the outer tube of the shock absorber, which thus represents an unrolling surface for the expansion bellows. The cover 11 is preferably sealed in relation to the piston rod 31. In the final assembly stage, a connection mechanism 41 is preferably screwed by means of a thread 43 to the piston rod 35. The connection mechanism 41 preferably comprises an axial support surface 45, so that the pneumatic spring is preferably axially fixed by means of the end surface 47 which is formed by the flange 37, and by means of the mounting surface 45, taking advantage of the system pressure prevailing inside the pneumatic spring 1.

The mounting surface 45 need not necessarily be a direct component of the connection mechanism 41, but it can also be at some axial distance. The seal of the pneumatic spring against the atmosphere in the vicinity of the expansion bellows 5 is preferably produced by contact between the expansion bellows 5 and the unrolling surface on the shock absorber, whereby, once again, the system pressure acting on the contact surface can preferably be used to guarantee that the expansion bellows 5 is practically self-sealing. It is advantageous if the expansion bellows 5 exerts a slight pressure fit against the outer tube 31 of the shock absorber.

FIGS. 3a to 3g illustrate several variants of a cover piece 11, the selection of which is preferably determined primarily by the number of pneumatic springs to be produced. For very large production runs, a highly appropriate version resembles the one illustrated in FIG. 3a, in which the receptacle 3, in the vicinity of its end, has been shaped to form the cover, so that the receptacle and the cover piece form a single part. A bead 48 forms a chambered seal 49 against the piston rod 35. To increase strength, there can preferably be a supporting ring 51 disposed between the cover piece 11 and the mounting surface 45 of the connecting mechanism 41.

Figure 3A:
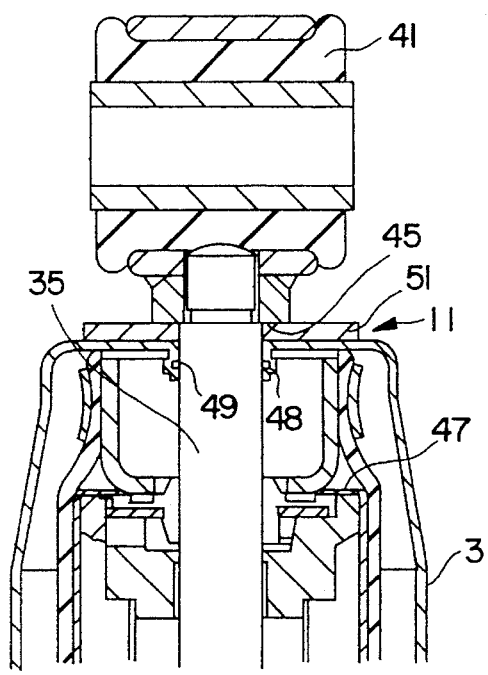
FIGS. 3a–3g show variants of various covers.
Figure 3B:
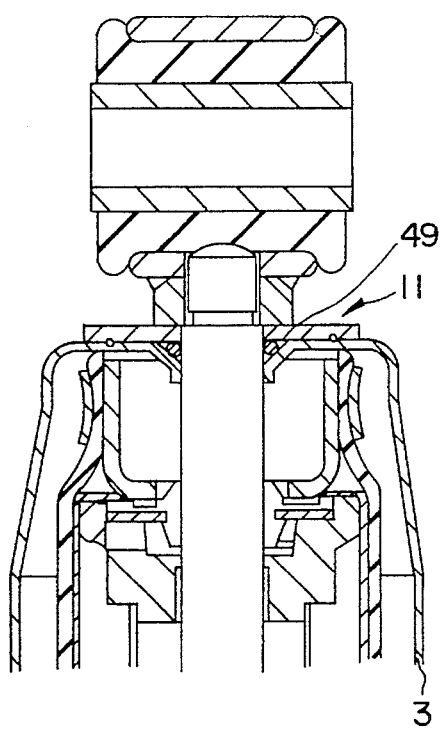
Figure 3C:
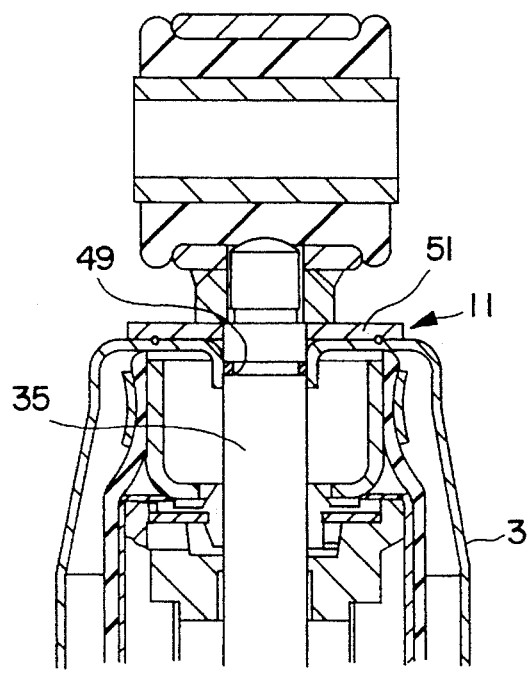
Figure 3D:
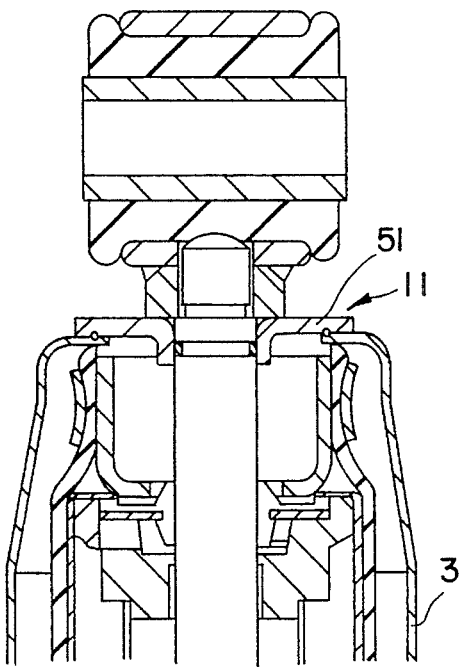

FIG. 3b is essentially the same as FIG. 3a. The chambered seal 49 in this case is between the supporting ring 51 and the cover piece 11. Alternatively, as shown in FIG. 3c, the version illustrated in FIG. 3b can be modified so that the seal 49 can also be inside a groove in the piston rod 35. The supporting ring 51 can also be used to form a chambered seal 49, and at the same time, together with the end of the receptacle 3, it forms the cover piece 11. FIG. 3d illustrates such an arrangement.

Figure 3E:
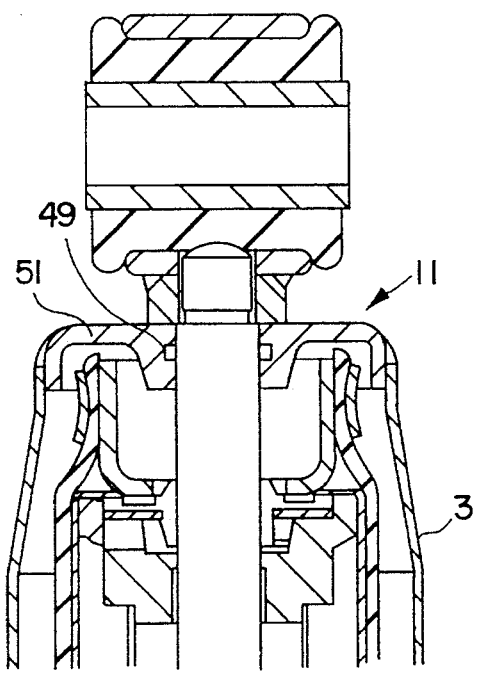
Figure 3F:
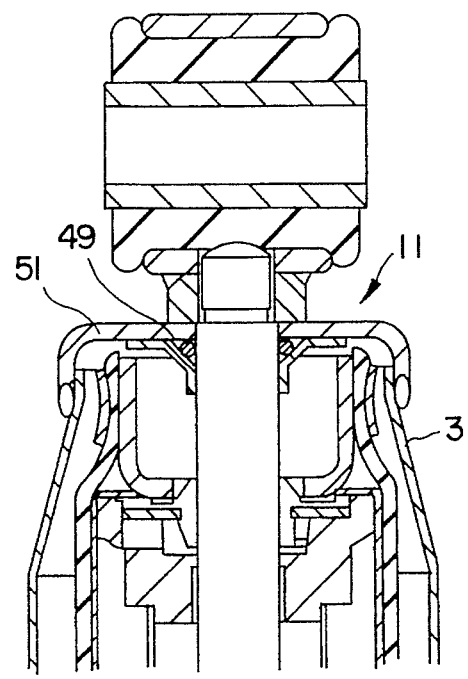
Figure 3G:
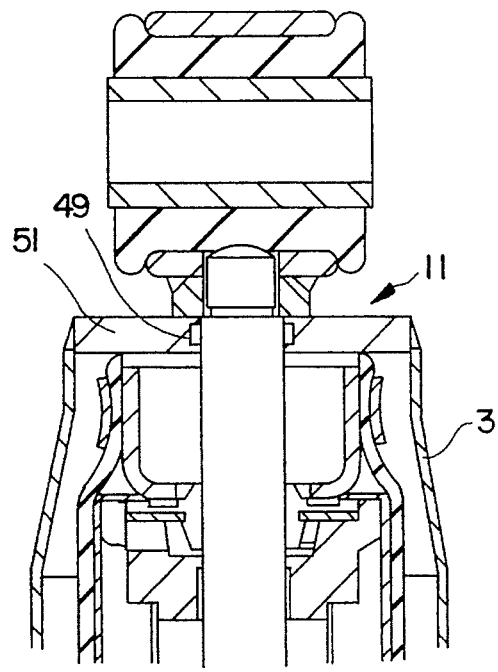

The versions illustrated in FIGS. 3e–g are particularly well-suited for extremely small production runs of pneumatic springs. In these variants, the cover pieces 11 are formed by a separate disk body 51 which is welded to the receptacle 3. The reshaping work required for the disk body is progressively reduced until FIG. 3g, in which a flat disc is used.

In other words, in accordance with a preferred embodiment of the present invention, as illustrated in FIGS. 3e–g, a separate disk body 51, welded to receptacle 3, may preferably be used for cover piece 11. FIGS. 3e–g essentially illustrate varying degrees of shaping for the disk body constituting cover piece 11 wherein a greater degree of shaping would essentially be required for the cover piece shown in FIG. 3e, a lesser degree of shaping would essentially be required for the cover piece shown in FIG. 3f, and a still lesser degree of shaping would essentially be required for the cover piece shown in FIG. 3g.

Figure 3H:
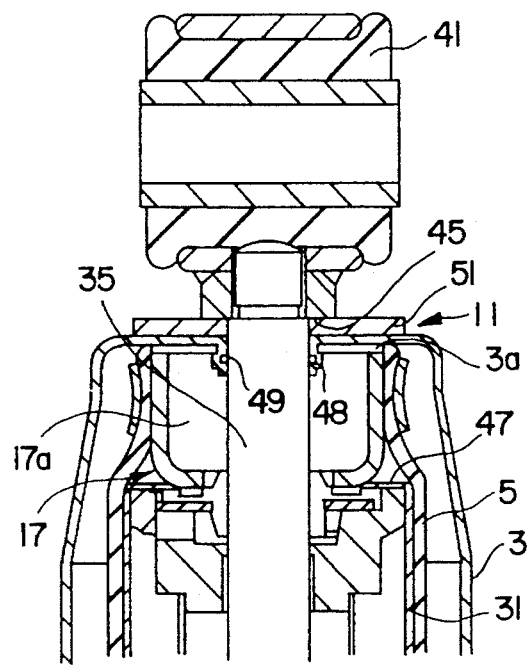
FIGS. 3h–3n are essentially the same views as FIGS. 3a–3g, but more detailed.
Figure 3I:
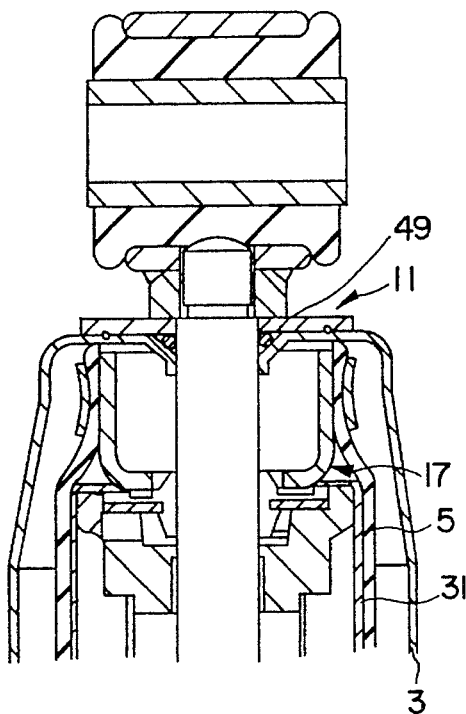
Figure 3J:
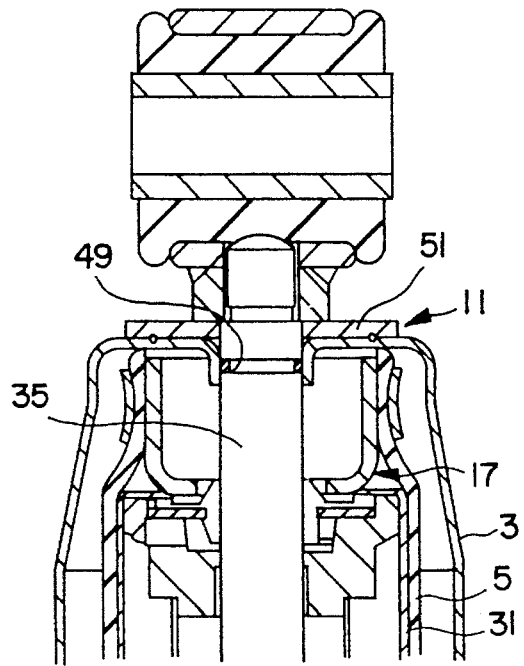
Figure 3K:
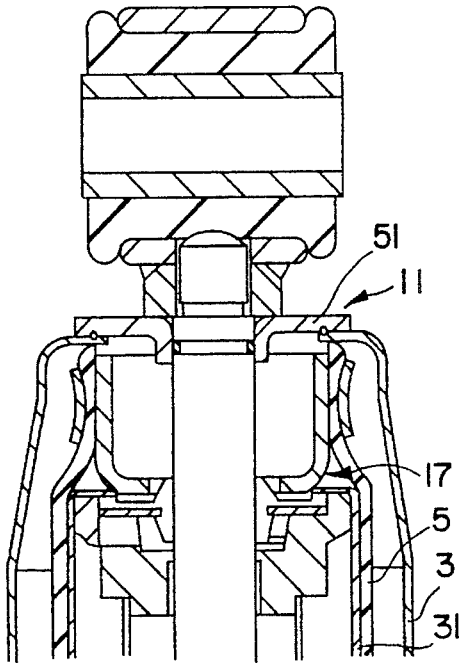
Figure 3L:
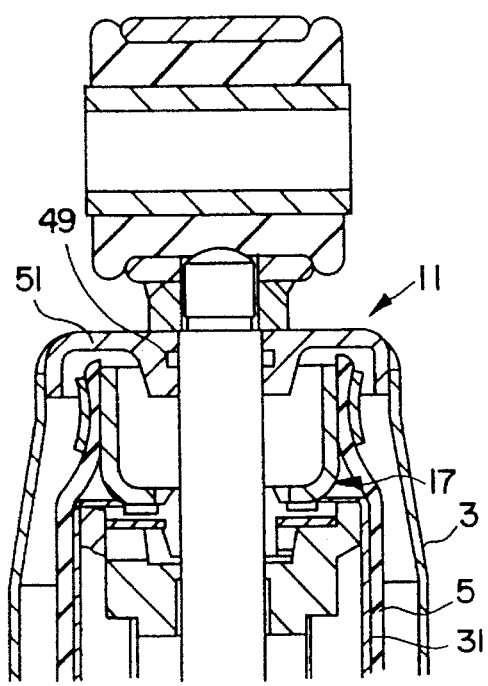
Figure 3M:
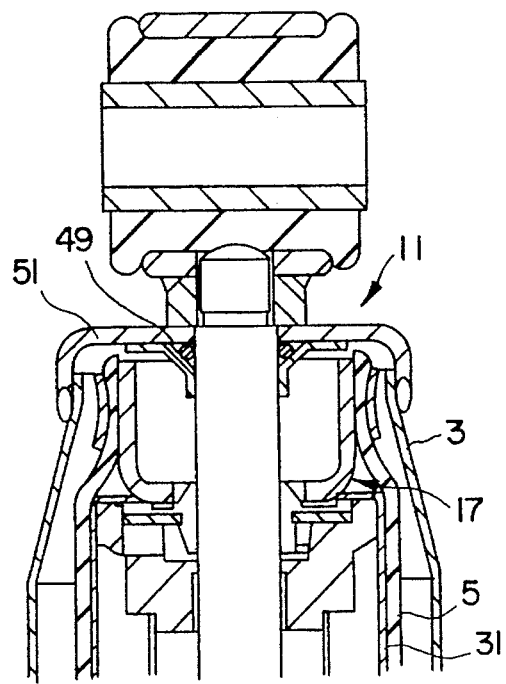
Figure 3N:
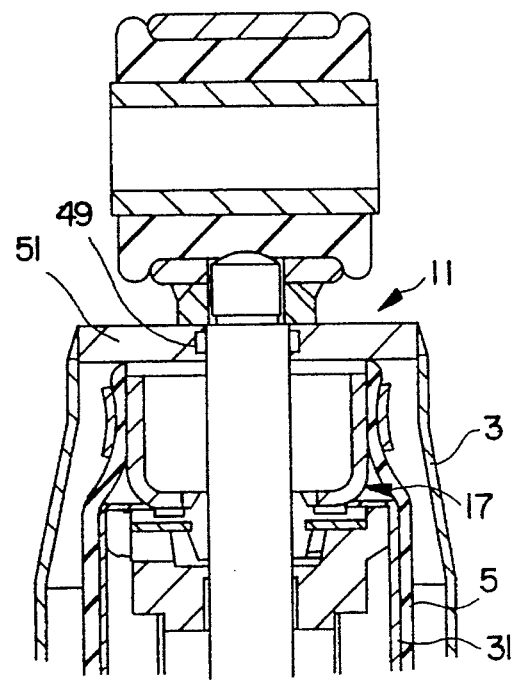

FIGS. 3h–3n are, respectively, essentially the same views as FIGS. 3a–3g, but more detailed. FIG. 3h particularly illustrates that, in accordance with the present invention, it is conceivable to permit an essentially loose seal to permit air into the cavity 17a formed by locking piece 17. Thus, a small gap 3a my essentially be provided in the vicinity of an upper rim portion of locking piece 17.

In addition to the locking piece 17 described above and illustrated in FIGS. 1 and 2, FIG. 4a illustrates a locking piece 17 which has the same basic layout. One additional distinction is that, on a tape tensioning element between the sleeve body 21 and the expansion bellows 5, there can be a beaded rim 53, which preferably braces the end of the expansion bellows 55 against the sleeve part 21. The connection between the locking piece 17 and the expansion bellows does not essentially need to be reclosable, so that this type of connection can be used.

Figure 4A:
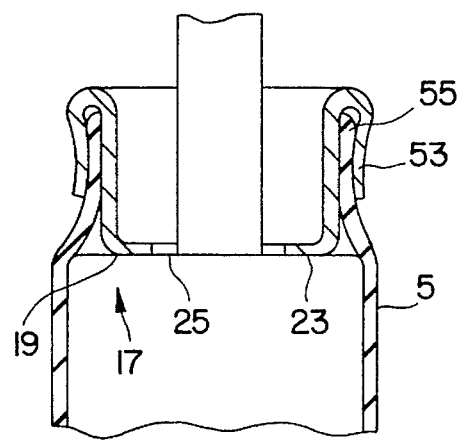
FIGS. 4a–4c show variants of various locking pieces.
Figure 4B:
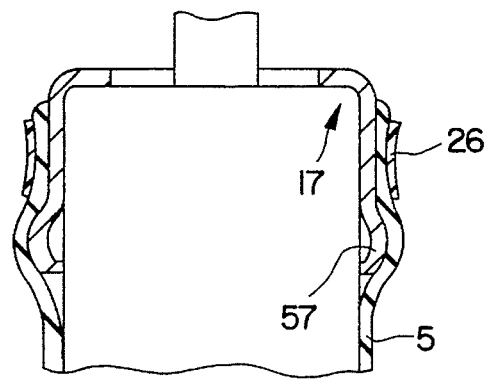

The basic layout of the locking piece 17 illustrated in FIG. 4b is largely the same as in FIGS. 1 and 2. One additional distinction is that the cup 19 can be oriented with the axial extension of the sleeve part 21 disposed in the direction of the connection mechanism 33 (see FIG. 2), so that the inside bottom 23 comes into contact with the end surface 47 of the outer tube 31 of the shock absorber 29. The outside bottom can be used, for example, as the impact surface for an additional spring (not shown). The expansion bellows 5 is preferably doubly secured in relation to the cup 19 by way of a bead 57. Compared to a cup without such a bead 57, the maximum stability under load of the locking piece is increased, because the expansion bellows is secured axially by the bead 57 and also by the tape tensioning element 26.

Figure 4C:
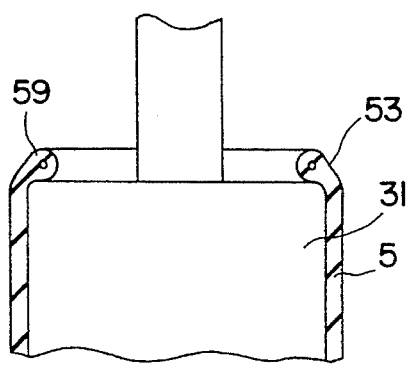

A particularly simple locking piece 17 can be obtained, as shown in FIG. 4c, if it is made an integral part of the expansion bellows 5. The opening of the expansion bellows end 53 is preferably smaller than the diameter of the shock absorber, so that the expansion bellows end 53 can be braced against the end surface 47 of the outer tube 31 of the shock absorber. To increase the strength of the unit, a reinforcement 59 can preferably be inserted inside the end 53 of the expansion bellows.

Figure 4D:
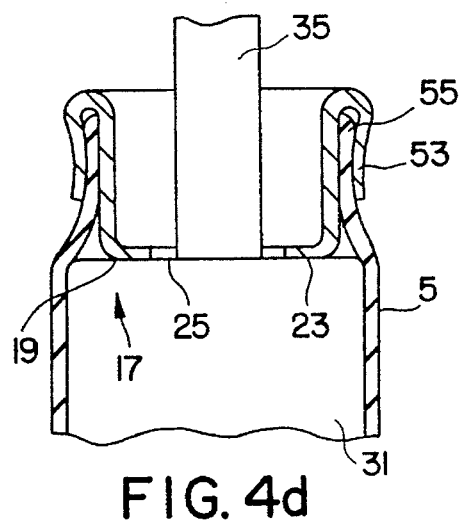
FIGS. 4d–4f are essentially the same views as FIGS. 4a–4c, but more detailed.
Figure 4E:
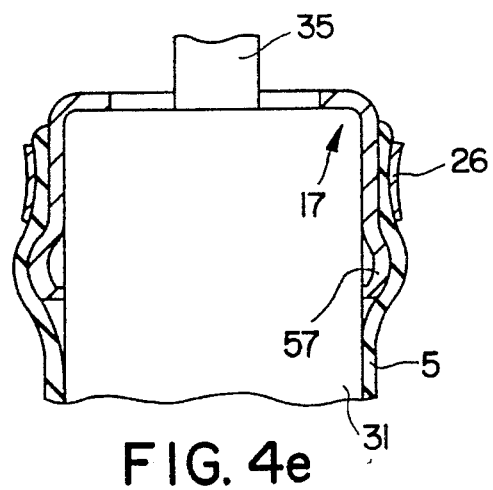
Figure 4F:
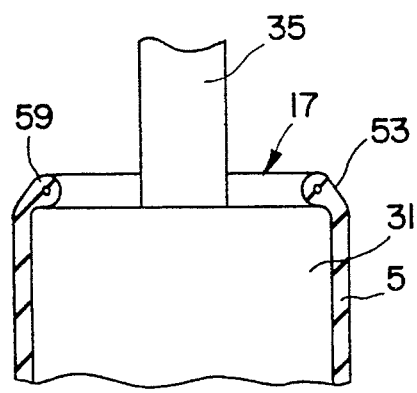

FIGS. 4d–4f are substantially the same views as FIGS. 4a–4c, but more detailed.

Figure 5:
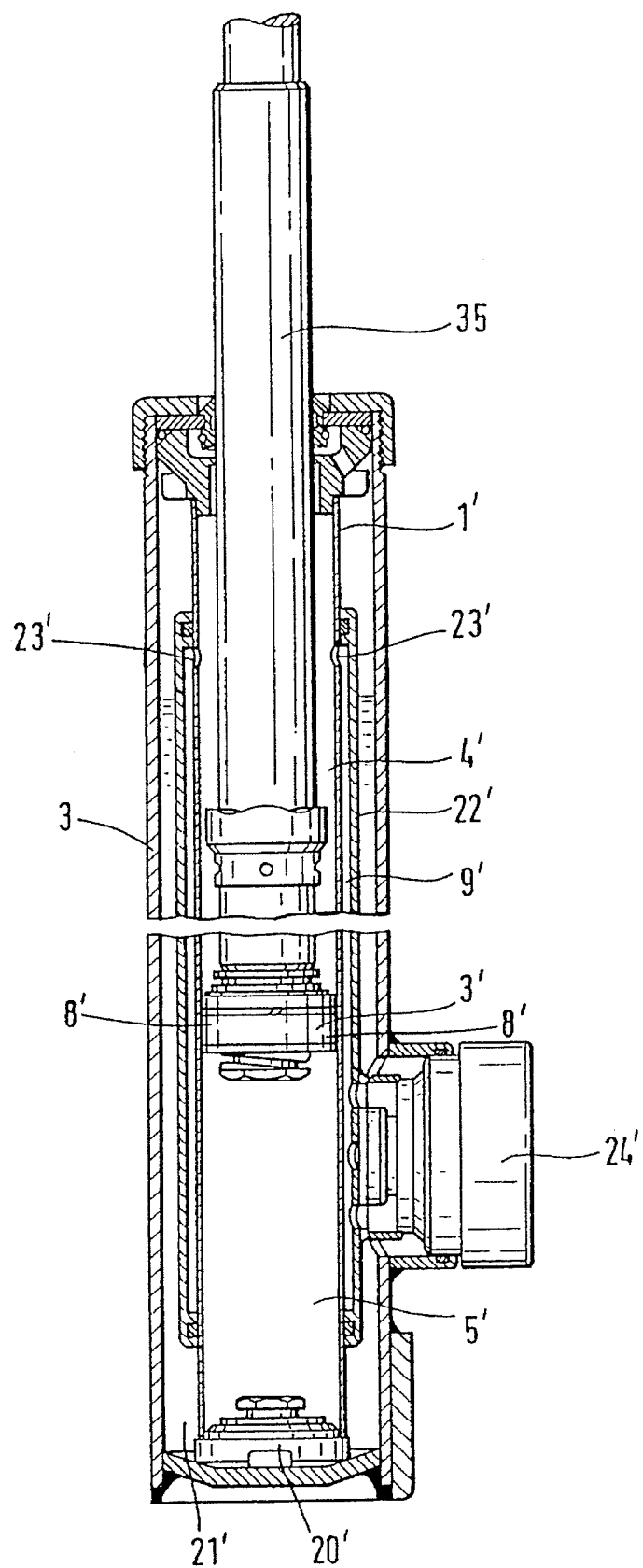
FIG. 5 illustrates a shock absorber which may be employed in accordance with the embodiments of the present invention.

FIG. 5 shows an example of a shock absorber which may be employed in accordance with the embodiments of the present invention. As illustrated in FIG. 5, an adjustable two-tube shock absorber can generally include a cylinder 1', which sealingly contains a hydraulic fluid, a piston rod 35, which piston rod 35 can sealingly project into cylinder 1' and which piston rod 35 can be axially displaceable with respect thereto, and a damping piston 3', which damping piston 3' can be sealingly disposed within cylinder 1' and can be connected to piston rod 35. Piston rod 35 can be attached to a structure portion, e.g., of a vehicle, which is not shown. Piston 3' can divide cylinder 1' into upper and lower working chambers 4' and 5', respectively, and can be provided with axially throughgoing passages and associated bottle valves 8' of conventional design and well known in the art, which can provide a substantially constant and non-variable resistance to the axial displacement of piston 3' and piston rod 35.

Two additional cylinders of progressively greater diameter 22' and 3 can be disposed coaxially with cylinder 1', so as to surround cylinder 1', thereby providing two additional annular chambers, a bypass chamber 9' and an equalization chamber 21'. Bypass chamber 9' can preferably interconnect with the working chambers via orifices 23', and a valve 20', located at the bottom of cylinder 1'. The bypass chamber 9' can preferably provide a means by which the damping medium contained therein can reach equalization chamber 21'. Cylinder 3 may essentially correspond to the outer tube 3 discussed heretofore.

A damping force control unit 24', which can act hydraulically in parallel with throttle valves 8' to modify the substantially constant damping force which throttle valves 8' can provide, can be mounted as a separate component attached to the shock absorber, and can be in fluid communication with bypass 9' and equalization chamber 21'.

It will be appreciated from the disclosure hereinabove that a pneumatic spring, or shock absorber assembly, or a method of making a shock absorber assembly, according to the present invention provides several advantages in comparison with known pneumatic springs, shock absorber assemblies, and methods of making shock absorber assemblies. Among these advantages is the fact that a pneumatic spring according to the present invention can essentially represent a standardized component which is appropriate for use with any of a large number of different shock absorbers, such shock absorbers having varying configurations on the outer tubes thereof. Thus, in a method of assembling a shock absorber assembly in accordance with the present invention, the manufacturing process may essentially be simplified in that there will essentially be less of a need for customized hardware. Particularly, the present invention allows for the mounting of a pneumatic spring according to the present invention with any of a wide range of different shock absorbers, while known processsess would essentially require customized assembly processes or customized hardware for different types of shock absorbers.

One feature of the invention resides broadly in the pneumatic spring comprising an elastic expansion bellows, a receptacle fastened to the expansion bellows, at least one fastening element between the expansion bellows and the receptacle, a point where it is attached to the vehicle chassis, a piston rod of a shock absorber which has a shock absorber outer tube, which represents an unrolling surface for the expansion bellows, and connection mechanisms on the piston rod and on the shock absorber outer tube respectively for the attachment of the pneumatic spring shock absorber unit inside a vehicle chassis, characterized by the fact that the expansion bellows 5 has a connecting piece 17 which is braced against a piston-rod-side end surface 47 of the shock absorber outer tube 31 and that the receptacle 3 has a cover 11, which interacts with a seal 49 and which is braced against an axial mounting surface, which executes a relative motion in relation to the outer tube 31 of the shock absorber identical to the motion executed by the vehicle body, whereby the axial fastening of the pneumatic spring 1 is achieved by the system pressure inside the pneumatic spring 1 by means of the locking piece 17 and the cover piece 11.

Another feature of the invention resides broadly in the pneumatic spring, characterized by the fact that the locking piece 17 is formed by a cup 19 which consists of a sleeve part 21 and a bottom 25 which has an opening 25, whereby the diameter of the opening 25 is larger than the diameter of the piston rod.

Yet another feature of the invention resides broadly in the pneumatic spring, characterized by the fact that the sleeve part 21 of the cup 19 is connected to the expansion bellows 5 by means of a tape tensioning element 26.

Still another feature of the invention resides broadly in the pneumatic spring, characterized by the fact that the cup 10 has a beaded rim 53, which braces the expansion bellows 5 against the sleeve part 21.

Still yet another feature of the invention resides broadly in the pneumatic spring, characterized by the fact that the sleeve part 21 extends axially from the end surface 47 of the shock absorber 29 toward the piston rod connecting mechanism 41.

Yet still another feature of the invention resides broadly in the pneumatic spring, characterized by the fact that the sleeve part 21 extends axially toward the connecting mechanism 33 on the shock absorber outer tube side.

Another feature of the invention resides broadly in the pneumatic spring, characterized by the fact that the locking piece 17 is a component of the expansion bellows 5, whereby the expansion bellows 5 has a smaller diameter than the diameter of the shock absorber 29.

Yet another feature of the invention resides broadly in the pneumatic spring, characterized by the fact that a reclosable connection between the receptacle 3 and the piston-rod-side fastening element is formed by a threaded connection 43 between the connection mechanism 41 and the piston rod 35, which comprises an axial support surface 45 for the cover piece 11.

Still another feature of the invention resides broadly in the pneumatic spring, characterized by the fact that the cover piece 11 of the receptacle 3 is formed by a disk body 51, whereby a chambered seal 49 is located between the piston rod 35 and the disk body 51.

Yet still another feature of the invention resides broadly in the pneumatic spring, characterized by the fact that the cover piece 11 is designed as one piece with the receptacle 3, whereby there is a chambered seal 49 between the piston rod 35 and the cover piece 11.

Still yet another feature of the invention resides broadly in the process for the assembly of a pneumatic spring, characterized by the fact that the expansion bellows 5 is partly plugged by a locking piece 17, that the free ends of the receptacle 3, equipped with a cover piece 11, and the expansion bellows 5 are inserted into one another and are then connected by means of one or more tape tensioning elements 9, that the shock absorber 29 is inserted with an at least partly extended piston rod 35 into the expansion bellows 5 until the locking piece 17 of the expansion bellows 5 comes into contact against the end surface 47 of the shock absorber 29, that the cover piece 11 of the receptacle 3 is threaded onto the piston rod 35 of the shock absorber 29.

Yet another feature of the invention resides broadly in the process for the assembly of a pneumatic spring, characterized by the fact that fastened to the piston rod 35 is a connecting mechanism 41, which comprises mounting surfaces 45 for the cover piece 11 of the receptacle 3.

Examples of pneumatic springs, alternatively termed as "air springs" or "air shocks", and components thereof, which may be utilized in accordance with the embodiments of the present invention, may be found in the following U.S. Pat. Nos.: 5,180,144, which issued to Hallyer et al. on Jan. 19, 1993; 5,009,401, which issued to Weitzenhof on Apr. 23, 1991; 4,988,082, which issued to Pees on Jan. 29, 1991; 4,332,397, which issued to Steger on Jun. 1, 1982; and 4,166,522, which issued to Bourcier on Sep. 4, 1979.

Examples of shock absorbers, which may be utilized in accordance with the embodiments of the present invention may be found in the following U.S. Pat. Nos.: 4,838,393, entitled "Hydro-mechanical Stop having a Restrictive Passage", which issued to Mourray et al. on Jun. 1, 1989; 4,817,928, entitled "Suspension System", which issued to Paton on Apr. 4, 1989; 4,527,674, entitled "Shock Absorber with a Hydro-mechanical Stop", which issued to Mourray on Jul. 9, 1985; 4,962,916, entitled "Compression Spring", which issued to Palinkas on Oct. 16, 1990; and 4,756,516, entitled "Resiliently Deformable Element Usable as an End Stop in a Motor Vehicle Suspension", which issued to Tondato on Jul. 12, 1988.

The invention as described hereinabove in the context of the preferred embodiments is not to be taken as limited to all of the provided details thereof, since modifications and variations thereof may be made without departing from the spirit and scope of the invention.

What is claimed is:

1. Shock absorber assembly comprising:
    a shock absorber, said shock absorber comprising:
        a sealed cylinder defining a chamber therein, said cylinder containing a damping fluid;
        a piston rod sealingly projecting into said cylinder and being axially displaceable with respect to said cylinder;
        a piston being attached to said piston rod, said piston being slidably disposed within said cylinder to sealingly divide said chamber into first and second chambers;
        means for permitting flow of damping fluid between said first and second chambers;
        a central longitudinal axis defined through said sealed cylinder, the central longitudinal axis defining a longitudinal direction of said shock absorber
        an outer tube, said outer tube having an end surface portion, said end surface portion being perpendicular to the longitudinal axis of said shock absorber;
    a pneumatic spring for applying a substantially longitudinally directed force to said end surface portion of said outer tube, to longitudinally displace said outer tube;
    said pneumatic spring comprising:
        a receptacle accommodating a portion of said outer tube of said shock absorber;

means for applying the substantially longitudinally directed force to said end surface portion of said shock absorber, to longitudinally displace said outer tube;

said means for applying the substantially longitudinally directed force comprising membrane means for providing the substantially longitudinally directed force;

means for transferring the substantially longitudinally directed force provided by said membrane means to said end portion of said shock absorber;

means for connecting said membrane means to said force transferring means;

said force transferring means comprising a component separate from said shock absorber; and said force transferring means being disposed directly adjacent said end surface portion of said outer tube to apply the substantially longitudinally directed force directly to said end surface portion.

2. The shock absorber assembly according to claim 1, wherein:

said shock absorber assembly is for being connected between a vehicle body and a wheel of a motor vehicle;

said shock absorber comprises first means for connecting said shock absorber assembly to a vehicle body and second means for connecting said shock absorber assembly to a motor vehicle wheel;

said receptacle comprises an orifice accommodating said piston rod, said piston rod being disposed through said orifice;

said pneumatic spring further comprises:

means for sealing about said piston rod in the vicinity of said orifice, to render said pneumatic spring substantially airtight;

a cover piece being disposed between said first connecting means and said force transferring means; and said cover piece at least partly defining a space housing said sealing means.

3. The shock absorber assembly according to claim 2, wherein:

said force transferring means is configured for undergoing longitudinal displacement, relative to said outer tube of said shock absorber, in direct response to movement of the vehicle body substantially along the longitudinal direction of said shock absorber.

4. The shock absorber assembly according to claim 3, wherein said pneumatic spring comprises:

a pressurizable volume defined within said receptacle and said membrane means;

said receptacle comprising a wall portion and a connection element disposed through said wall portion;

said connection element being configured for delivering air to said pressurizable volume to pressurize said pressurizable volume;

said membrane means being configured for providing the substantially longitudinally directed force as a function of the pressurization of said pressurizable volume; and said pneumatic spring for being fixed in the longitudinal direction of said shock absorber upon pressurization of said pressurizable volume and transfer of the substantially longitudinally directed force to said end portion of said shock absorber.

5. The shock absorber assembly according to claim 4, wherein:

said piston rod has a diameter;

said force transferring means has a hole disposed therethrough accommodating said piston rod, said piston rod being disposed through said hole;

said hole in said force transferring means has a diameter; and the diameter of said orifice is greater than the diameter of said piston rod.

6. The shock absorber assembly according to claim 5, wherein:

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup is disposed towards said end surface portion of said outer tube of said shock absorber;

said sleeve portion of said cup extends from said disk portion towards said first connecting means;

said cover piece comprises a disk body;

said disk body is disposed between said receptacle and said first connecting means; and said space housing said sealing means being defined solely between said disk body and said piston rod.

7. The shock absorber assembly according to claim 5, wherein:

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup is disposed towards said end surface portion of said outer tube of said shock absorber;

said sleeve portion of said cup extends from said disk portion towards said first connecting means;

said receptacle comprises a generally circular end portion disposed at an end of said cylindrical portion, towards said first connecting means;

said cover piece comprises at least a portion of said end portion of said receptacle and is integral therewith; and said space housing said sealing means being defined solely between said end portion of said receptacle and said piston rod.

8. The shock absorber assembly according to claim 5, wherein:

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises one of the following arrangements (a), (b) and (c):

(a) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said sleeve portion comprising a main body portion a flanged bead portion extending from an end of said main body portion, said main body portion being cylindrical;

said flanged bead portion having a cross section of a hairpin curve, said hairpin curve being configured such that said flanged bead portion doubles back towards said main body portion;

said means for connecting said membrane means to said force transferring means comprising said flanged bead portion, wherein a portion of said membrane means is fixedly held between said flanged bead portion and said main body portion, about the circumference of said sleeve portion of said cup;

said disk portion of said cup being disposed towards said end surface portion of said outer tube of said shock absorber; and said sleeve portion of said cup extending from said disk portion towards said first connecting means;

(b) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said means for connecting said membrane means to said force transferring means comprising a tape tensioning element, said tape tensioning element being disposed about the circumference of said sleeve portion of said cup and fixedly holding a portion of said membrane means onto said sleeve portion of said cup;

said disk portion of said cup being disposed towards said first connecting means;

said sleeve portion of said cup extending from said disk portion towards said end portion of said outer tube of said shock absorber;

said sleeve portion having an end away from said disk portion;

said end away from said disk portion having a bead portion;

said bead portion being bulged radially outwardly;

said bead portion being disposed adjacent said tape tensioning element along the longitudinal direction of said shock absorber, to strengthen the hold provided by said tape tensioning element on said membrane means;

(c) said force transferring mens comprising a disk, said disk being generally circular;

said disk being oriented perpendicular to said piston rod;

said disk comprising a groove about the circumference thereof;

said membrane means comprising an end portion secured about said disk in said groove of said disk; and said end portion of said membrane means comprising a reinforcement element securing said end membrane means in said groove of said disk, said reinforcement element providing a constricting force about said end portion of said membrane means.

9. Method for assembling a shock absorber assembly, said method comprising the steps of:

providing a shock absorber;

said step of providing the shock shock absorber comprising the steps of:

providing a sealed cylinder defining a chamber therein, said cylinder containing a damping fluid;

providing a piston rod sealingly projecting into said cylinder and being axially displaceable with respect to said cylinder;

providing a piston being attached to said piston rod, said piston being slidably disposed within said cylinder to sealingly divide said chamber into first and second chambers;

providing means for permitting flow of damping fluid between said first and second chambers;

defining a central longitudinal axis through said sealed cylinder, the central longitudinal axis defining a longitudinal direction of said shock absorber providing an outer tube, said outer tube having an end surface portion, said end surface portion being perpendicular to the longitudinal axis of said shock absorber;

providing a pneumatic spring for applying a substantially longitudinally directed force to said end surface portion of said outer tube, to longitudinally displace said outer tube;

said step of providing said pneumatic spring comprising the steps of:

provided a receptacle for accommodating a portion of said outer tube of said shock absorber;

providing means for applying the substantially longitudinally directed force to said end surface portion of said shock absorber, to longitudinally displace said outer tube;

said step of providing means for applying the substantially longitudinally directed force comprising providing membrane means for providing the substantially longitudinally directed force;

providing means for transferring the substantially longitudinally directed force provided by said membrane means to said end portion of said shock absorber;

providing means for connecting said membrane means to said force transferring means;

configuring said force transferring means to comprise a component separate from said shock absorber; and disposing said force transferring means directly adjacent said end surface portion of said outer tube to permit application of the substantially longitudinally directed force directly to said end surface portion.

10. The method assembly according to claim 9, further comprising the steps of:

configuring said shock absorber assembly for being connected between a vehicle body and a wheel of a motor vehicle;

said step of providing said shock absorber comprising the step of providing first means for connecting said shock absorber assembly to a vehicle body and second means for connecting said shock absorber assembly to a motor vehicle wheel;

said step of providing said receptacle comprising providing an orifice for accommodating said piston rod;

disposing said piston rod through said orifice;

said step of providing said pneumatic spring further comprises the steps of:

providing means for sealing about said piston rod in the vicinity of said orifice, to render said pneumatic spring substantially airtight;

providing a cover piece and disposing said cover piece between said first connecting means and said force transferring means;

configuring said cover piece to at least partly define a space for housing said sealing means; and housing said sealing means in said space.

11. The method according to claim 10, further comprising the step of:

configuring said force transferring means for undergoing longitudinal displacement, relative to said outer tube of said shock absorber, in direct response to movement of the vehicle body substantially along the longitudinal direction of said shock absorber.

12. The method according to claim 11, wherein said step of providing said pneumatic spring comprises the steps of:

defining a pressurizable volume defined within said receptacle and said membrane means;

configuring said receptacle to comprise a wall portion and disposing a connection element through said wall portion;

configuring said connection element for delivering air to said pressurizable volume to pressurize said pressurizable volume;

configuring said membrane means for providing the substantially longitudinally directed force as a function of the pressurization of said pressurizable volume;

configuring said pneumatic spring for being fixed in the longitudinal direction of said shock absorber upon pressurization of said pressurizable volume and transfer of the substantially longitudinally directed force to said end portion of said shock absorber; and delivering air to said pressurizable volume through said connection element to pressurize said pressurizable volume.

13. The method according to claim 12, further comprising the step of configuring said shock absorber assembly such that:

said piston rod has a diameter;

said force transferring means has a hole disposed therethrough accommodating said piston rod, said piston rod being disposed through said hole;

said hole in said force transferring means has a diameter;

the diameter of said orifice is greater than the diameter of said piston rod;

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup is disposed towards said end surface portion of said outer tube of said shock absorber;

said sleeve portion of said cup extends from said disk portion towards said first connecting means;

said cover piece comprises a disk body;

said disk body is disposed between said receptacle and said first connecting means; and said space housing said sealing means being defined solely between said disk body and said piston rod.

14. The method according to claim 12, further comprising the step of configuring said shock absorber assembly such that:

said piston rod has a diameter;

said force transferring means has a hole disposed therethrough accommodating said piston rod, said piston rod being disposed through said hole;

said hole in said force transferring means has a diameter;

the diameter of said orifice is greater than the diameter of said piston rod;

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup is disposed towards said end surface portion of said outer tube of said shock absorber;

said sleeve portion of said cup extends from said disk portion towards said first connecting means;

said receptacle comprises a generally circular end portion disposed at an end of said cylindrical portion, towards said first connecting means;

said cover piece comprises at least a portion of said end portion of said receptacle and is integral therewith; and said space housing said sealing means being defined solely between said end portion of said receptacle and said piston rod.

15. The method according to claim 12, further comprising the step of configuring said shock absorber assembly such that:

said piston rod has a diameter;

said force transferring means has a hole disposed therethrough accommodating said piston rod, said piston rod being disposed through said hole;

said hole in said force transferring means has a diameter;

the diameter of said orifice is greater than the diameter of said piston rod;

said piston rod has a first end and a second end;

said first connecting means is disposed at said first end of said piston rod;

said second connecting means is disposed at said second end of said piston rod;

said first end of said piston rod comprises external thread means;

said first connecting means comprises internal thread means being threaded on said external thread means of said first end of said piston rod;

said receptacle comprises a generally cylindrical portion, said generally cylindrical portion having said wall portion;

said cover piece being generally circular in shape;

said force transferring means comprises one of the following arrangements (a), (b) and (c):

(a) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said sleeve portion comprising a main body portion a flanged bead portion extending from an end of said main body portion, said main body portion being cylindrical;

said flanged bead portion having a cross section of a hairpin curve, said hairpin curve being configured such that said flanged bead portion doubles back towards said main body portion;

said means for connecting said membrane means to said force transferring means comprising said flanged bead portion, wherein a portion of said membrane means is fixedly held between said flanged bead portion and said main body portion, about the circumference of said sleeve portion of said cup;

said disk portion of said cup being disposed towards said end surface portion of said outer tube of said shock absorber; and said sleeve portion of said cup extending from said disk portion towards said first connecting means;

(b) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said means for connecting said membrane means to said force transferring means comprising a tape tensioning element, said tape tensioning element being disposed about the circumference of said sleeve portion of said cup and fixedly holding a portion of said membrane means onto said sleeve portion of said cup;

said disk portion of said cup being disposed towards said first connecting means;

said sleeve portion of said cup extending from said disk portion towards said end portion of said outer tube of said shock absorber;

said sleeve portion having an end away from said disk portion;

said end away from said disk portion having a bead portion;

said bead portion being bulged radially outwardly;

said bead portion being disposed adjacent said tape tensioning element along the longitudinal direction of said shock absorber, to strengthen the hold provided by said tape tensioning element on said membrane means;

(c) said force transferring mens comprising a disk, said disk being generally circular;

said disk being oriented perpendicular to said piston rod;

said disk comprising a groove about the circumference thereof;

said membrane means comprising an end portion secured about said disk in said groove of said disk; and said end portion of said membrane means comprising a reinforcement element securing said end membrane means in said groove of said disk, said reinforcement element providing a constricting force about said end portion of said membrane means.

16. Shock absorber assembly comprising:

a pneumatic spring for applying a substantially longitudinally directed force along a longitudinal axis of a shock absorber, to an end surface portion of an outer tube of the shock absorber, to longitudinally displace the outer tube of the shock absorber;

said pneumatic spring comprising:

a receptacle for accommodating a portion of an outer tube of a shock absorber;

means for applying a substantially longitudinally directed force to an end surface portion of the outer tube of the shock absorber, to longitudinally displace the outer tube;

said means for applying a substantially longitudinally directed force comprising membrane means for providing the substantially longitudinally directed force;

means for transferring the substantially longitudinally directed force provided by said membrane means to the end portion of the shock absorber;

means for connecting said membrane means to said force transferring means;

said force transferring means comprising a component for being separate from the shock absorber; and said force transferring means for being disposed directly adjacent the end surface portion of the outer tube to apply the substantially longitudinally directed force directly to the end surface portion.

17. The shock absorber assembly according to claim 16, wherein:

said shock absorber assembly is for being connected between a vehicle body and a wheel of a motor vehicle;

the shock absorber comprises first means for connecting said shock absorber assembly to a vehicle body and second means for connecting said shock absorber assembly to a motor vehicle wheel;

said receptacle comprises an orifice for accommodating the piston rod, the piston rod for being disposed through said orifice;

said pneumatic spring further comprises:

means for sealing about said piston rod in the vicinity of said orifice, to render said pneumatic spring substantially airtight;

a cover piece for being disposed between said first connecting means and said force transferring means; and said cover piece at least partly defining a space housing said sealing means.

18. The shock absorber assembly according to claim 17, wherein:

said force transferring means is configured for undergoing longitudinal displacement, relative to the outer tube of the shock absorber, in direct response to movement of the vehicle body substantially along the longitudinal direction of the shock absorber;

said pneumatic spring comprises a pressurizable volume defined within said receptacle and said membrane means;

said receptacle comprising a wall portion and a connection element disposed through said wall portion;

said connection element being configured for delivering air to said pressurizable volume to pressurize said pressurizable volume;

said membrane means being configured for providing the substantially longitudinally directed force as a function of the pressurization of said pressurizable volume;

said pneumatic spring for being fixed in the longitudinal direction of said shock absorber upon pressurization of said pressurizable volume and transfer of the substantially longitudinally directed force to said end portion of said shock absorber;

the piston rod has a diameter;

said force transferring means has a hole disposed therethrough for accommodating the piston rod, the piston rod for being disposed through said hole;

said hole in said force transferring means has a diameter;

the diameter of said orifice is for being greater than the diameter of the piston rod;

the piston rod has a first end and a second end;

said first connecting means is disposed at the first end of the piston rod;

said second connecting means is disposed at the second end of the piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup for being disposed towards the end surface portion of the outer tube of the shock absorber;

said sleeve portion of said cup is for extending from said disk portion towards the first connecting means;

said cover piece comprises a disk body;

said disk body is for being disposed between said receptacle and the first connecting means; and said space housing said sealing means is for being defined solely between said disk body and the piston rod.

19. The shock absorber assembly according to claim 17, wherein:

said force transferring means is configured for undergoing longitudinal displacement, relative to the outer tube of the shock absorber, in direct response to movement of the vehicle body substantially along the longitudinal direction of the shock absorber;

said pneumatic spring comprises a pressurizable volume defined within said receptacle and said membrane means;

said receptacle comprising a wall portion and a connection element disposed through said wall portion;

said connection element being configured for delivering air to said pressurizable volume to pressurize said pressurizable volume;

said membrane means being configured for providing the substantially longitudinally directed force as a function of the pressurization of said pressurizable volume;

said pneumatic spring for being fixed in the longitudinal direction of said shock absorber upon pressurization of said pressurizable volume and transfer of the substantially longitudinally directed force to said end portion of said shock absorber;

the piston rod has a diameter;

said force transferring means has a hole disposed therethrough for accommodating the piston rod, the piston rod for being disposed through said hole;

said hole in said force transferring means has a diameter;

the diameter of said orifice is for being greater than the diameter of the piston rod;

the piston rod has a first end and a second end;

said first connecting means is disposed at the first end of the piston rod;

said second connecting means is disposed at the second end of the piston rod;

said receptacle comprises a generally cylindrical portion, said generally cylindrical portion having said wall portion;

said cover piece being generally circular in shape;

said force transferring means comprises a cup;

said cup comprises a disk portion and a sleeve portion, said disk portion being generally circular and said sleeve portion being generally cylindrical;

said sleeve portion extends from said disk portion to form said cup;

said hole is disposed in said disk portion;

said means for connecting said membrane means to said force transferring means comprises a tape tensioning element, said tape tensioning element being disposed about the circumference of said sleeve portion of said cup and fixedly holding a portion of said membrane means onto said sleeve portion of said cup;

said disk portion of said cup is for being disposed towards the end surface portion of the outer tube of the shock absorber;

said sleeve portion of said cup is for extending from said disk portion towards the first connecting means;

said receptacle comprises a generally circular end portion disposed at an end of said cylindrical portion, towards said first connecting means;

said cover piece comprises at least a portion of said end portion of said receptacle and is integral therewith; and said space housing said sealing means is for being defined solely between said end portion of said receptacle and the piston rod.

20. The method according to claim 17, wherein:

said force transferring means is configured for undergoing longitudinal displacement, relative to the outer tube of the shock absorber, in direct response to movement of the vehicle body substantially along the longitudinal direction of the shock absorber;

said pneumatic spring comprises a pressurizable volume defined within said receptacle and said membrane means;

said receptacle comprising a wall portion and a connection element disposed through said wall portion;

said connection element being configured for delivering air to said pressurizable volume to pressurize said pressurizable volume;

said membrane means being configured for providing the substantially longitudinally directed force as a function of the pressurization of said pressurizable volume;

said pneumatic spring for being fixed in the longitudinal direction of said shock absorber upon pressurization of said pressurizable volume and transfer of the substantially longitudinally directed force to said end portion of said shock absorber;

the piston rod has a diameter;

said force transferring means has a hole disposed therethrough for accommodating the piston rod, the piston rod for being disposed through said hole;

said hole in said force transferring means has a diameter;

the diameter of said orifice for being greater than the diameter of the piston rod;

the piston rod has a first end and a second end;

said first connecting means is disposed at the first end of the piston rod;

said second connecting means is disposed at the second end of the piston rod;

said receptacle comprises a generally cylindrical portion, said generally cylindrical portion having said wall portion;

said cover piece being generally circular in shape;

said force transferring means comprises one of the following arrangements (a), (b) and (c):

(a) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said sleeve portion comprising a main body portion a flanged bead portion extending from an end of said main body portion, said main body portion being cylindrical;

said flanged bead portion having a cross section of a hairpin curve, said hairpin curve being configured such that said flanged bead portion doubles back towards said main body portion;

said means for connecting said membrane means to said force transferring means comprising said flanged bead portion, wherein a portion of said membrane means is fixedly held between said flanged bead portion and said main body portion, about the circumference of said sleeve portion of said cup;

said disk portion of said cup is for being disposed towards said end surface portion of the outer tube of the shock absorber; and said sleeve portion of said cup is for extending from said disk portion towards the first connecting means;

(b) a cup;

said cup comprising a disk portion and a sleeve portion, said disk portion being generally circular and said sleeve portion being generally cylindrical;

said sleeve portion extending from said disk portion to form said cup;

said hole being disposed in said disk portion;

said means for connecting said membrane means to said force transferring means comprising a tape tensioning element, said tape tensioning element being disposed about the circumference of said sleeve portion of said cup and fixedly holding a portion of said membrane means onto said sleeve portion of said cup;

said disk portion of said cup is for being disposed towards the first connecting means;

said sleeve portion of said cup is for extending from said disk portion towards the end portion of the outer tube of the shock absorber;

said sleeve portion having an end away from said disk portion;

said end away from said disk portion having a bead portion;

said bead portion being bulged radially outwardly;

said bead portion being disposed adjacent said tape tensioning element along the longitudinal direction of said shock absorber, to strengthen the hold provided by said tape tensioning element on said membrane means;

(c) said force transferring mens comprising a disk, said disk being generally circular;

said disk being oriented perpendicular to the piston rod;

said disk comprising a groove about the circumference thereof;

said membrane means comprising an end portion secured about said disk in said groove of said disk; and said end portion of said membrane means comprising a reinforcement element securing said end membrane means in said groove of said disk, said reinforcement element providing a constricting force about said end portion of said membrane means.

\* \* \* \* \*

UNITED STATES PATENT AND TRADEMARK OFFICE
CERTIFICATE OF CORRECTION

PATENT NO. : 5,480,129
DATED : January 2, 1996
INVENTOR(S) : Heinz-Joachim GILSDORF, Heinz SYDEKUM, and Holger GUBITZ It is certified that error appears in the above-indentified patent and that said Letters Patent is hereby corrected as shown below:

In column 8, line 27, after 'Jun.', delete "1," and insert --13,--.

Signed and Sealed this

Twenty-sixth Day of November 1996

Attest:

BRUCE LEHMAN

*Attesting Officer*  *Commissioner of Patents and Trademarks*